(12) United States Patent
Gao et al.

(10) Patent No.: US 11,368,951 B2
(45) Date of Patent: Jun. 21, 2022

(54) UPLINK TRANSMISSION METHOD, NETWORK SIDE DEVICE AND TERMINAL

(71) Applicant: CHINA ACADEMY OF TELECOMMUNICATIONS TECHNOLOGY, Beijing (CN)

(72) Inventors: Xuejuan Gao, Beijing (CN); Xueming Pan, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 42 days.

(21) Appl. No.: 16/324,543

(22) PCT Filed: Aug. 4, 2017

(86) PCT No.: PCT/CN2017/095921
§ 371 (c)(1),
(2) Date: Feb. 8, 2019

(87) PCT Pub. No.: WO2018/028510
PCT Pub. Date: Feb. 15, 2018

(65) Prior Publication Data
US 2019/0191435 A1    Jun. 20, 2019

(30) Foreign Application Priority Data

Aug. 10, 2016 (CN) .......................... 201610652031.4

(51) Int. Cl.
*H04W 72/04* (2009.01)
(52) U.S. Cl.
CPC ....... *H04W 72/0446* (2013.01); *H04W 72/04* (2013.01); *H04W 72/042* (2013.01)

(58) Field of Classification Search
None
See application file for complete search history.

(56) References Cited

U.S. PATENT DOCUMENTS 7,751,363 B1    7/2010   Etemad et al.
2009/0109937 A1   4/2009   Cave et al.
(Continued)

FOREIGN PATENT DOCUMENTS

CN    101141166 A    3/2008
CN    102447538 A    5/2012
(Continued)

OTHER PUBLICATIONS

Written Opinion for PCT/CN2017/095921 dated Nov. 3, 2017 and its English translation provided by WIPO.
(Continued)

*Primary Examiner* — Saad Khawar
(74) *Attorney, Agent, or Firm* — Ladas & Parry, LLP

(57) ABSTRACT

The application provides an uplink transmission method, a network side device and a terminal. The uplink transmission method includes that a terminal receives first configuration information at a first-time-domain position, and receives second configuration information at a second-time-domain position, in which the first configuration information indicates frequency-domain resource information of an uplink shortened Transmission Time Interval (sTTI) transmission performed by the terminal at a third-time-domain position, and the second configuration information indicates scheduling information for the uplink sTTI transmission performed by the terminal at the third-time-domain position; and the terminal performs the uplink sTTI transmission at the third-time-domain position, according to the first and second configuration information.

17 Claims, 5 Drawing Sheets

(56) References Cited

U.S. PATENT DOCUMENTS

2017/0164363 A1 6/2017 Zhang et al.
2018/0242347 A1* 8/2018 Sahlin ............... H04W 72/0446
2019/0110332 A1* 4/2019 Wikstrom ......... H04W 52/0229

FOREIGN PATENT DOCUMENTS

| CN | 104468030 A | 3/2015 |
|---|---|---|
| CN | 105827385 A | 8/2016 |
| EP | 3252981 A2 | 12/2017 |
| WO | 2009/055577 A1 | 4/2009 |

OTHER PUBLICATIONS

International Preliminary Report on Patentability for PCT/CN2017/095921 dated Feb. 12, 2019 and its English translation provided by WIPO.

Office Action issued for Chinese Application No. 201610652031.4 dated Dec. 29, 2018.

International Search Report for PCT/CN2017/095921 dated Nov. 3, 2017 and its English translation provided by WIPO.

Written Opinion for PCT/CN2017/095921 dated Nov. 3, 2017 and its English translation provided by Google Translate.

"Design of DL DCE for short TTI", RI-160931, 3GPP TSG RAN WG1 Meeting #84, Malta, Feb. 15-19, 2016.

DCI design for short TTI, RI-162588, 3GPP TSG RAN WG1 Meeting #84bis, Busan, Korea, Apr. 11-15, 2016.

"On design of DL control channel for shorter TTI operation", R1-163267, 3GPP TSG-RAN WG1 Meeting #84bis, Busan, South Korea, Mar. 11-15, 2016.

"On/Off time mask", R4-090893, 3GPP TSG-RAN4 Meeting #50, Athens, Greece, Feb. 9-13, 2009.

Extended European Search Report for EP app. No. 17838640.5, dated May 31, 2019.

* cited by examiner

UPLINK TRANSMISSION METHOD, NETWORK SIDE DEVICE AND TERMINAL

CROSS-REFERENCE TO RELATED APPLICATIONS

This application is the U.S. national phase of PCT application No. PCT/CN2017/095921 filed on Aug. 4, 2017, which claims priority to Chinese Patent Application No. 201610652031.4, filed with the Chinese Patent Office on Aug. 10, 2016, the disclosures of which are incorporated by reference herein in their entireties.

TECHNICAL FIELD

The application relates to mobile communication technologies, and more particularly, to an uplink transmission method, a network side device and a terminal.

BACKGROUND

In the existing Long Term Evolution (LTE) system, length of a Transmission Time Interval (TTI) is 1 ms. While accompanying with the development and change about requirements of mobile communication services, higher user-plane delay performance requirements for the future mobile communication system have been defined by multiple organizations, such as, International Telecommunication Union (ITU). One of the main methods to shorten user delay performance is to reduce TTI length.

A typical working mode of shortened TTI (sTTI) transmission is as follows. The existing mechanism of the LTE has defined a subframe structure, which includes multiple sTTI transmissions. Each of the multiple sTTI transmissions is shorter than 1 ms. Uplink sTTI transmission supports a shortened Physical Uplink Shared Channel (sPUSCH) and a shortened Physical Uplink Control Channel (sPUCCH). Length of the sTTI may be 2, 3, 4, or 7 Orthogonal Frequency-Division Multiplexing (OFDM) symbols, or Single-carrier Frequency-Division Multiple Access (SC-FDMA) symbols. Definitely, the following scenes are not excluded, e.g., number of other symbols does not exceed 14, or length of a time domain does not exceed 1 ms. One subframe may include multiple sPUSCH transmissions, and/or, multiple sPUCCH transmissions. However, the related technologies do not provide a specific method, which indicates how to implement multiple sTTI transmissions within one subframe.

SUMMARY

The technical problem to be solved by the embodiments of the application is to provide an uplink transmission method, a network side device and a terminal, so as to implement an uplink sTTI transmission.

To solve foregoing technical problems, an embodiment of the application provides an uplink transmission method, including:

receiving, by a terminal, first configuration information at a first-time-domain position, receiving second configuration information at a second-time-domain position, wherein the first configuration information indicates frequency-domain resource information for an uplink shortened Transmission Time Interval (sTTI) transmission, which is performed by the terminal at a third-time-domain position, and the second configuration information indicates scheduling information for the uplink sTTI transmission, which is performed by the terminal at the third-time-domain position; and, performing, by the terminal, the uplink sTTI transmission at the third-time-domain position, according to the first and second configuration information.

An embodiment of the application also provides another uplink transmission method, including:

transmitting, by a network side device, first configuration information to a terminal at a first-time-domain position, and transmitting second configuration information to the terminal at a second-time-domain position, wherein the first configuration information indicates frequency-domain resource information for an uplink sTTI transmission, which is performed by the terminal at a third-time-domain position, and the second configuration information indicates scheduling information for the uplink sTTI transmission, which is performed by the terminal at the third-time-domain position; and, receiving, by the network side device, the uplink sTTI transmission at the third-time-domain position, according to the first and second configuration information.

An embodiment of the application also provides a terminal, including a receiving unit, and an uplink transmitting unit, wherein the receiving unit is configured to receive first configuration information at a first-time-domain position, and receive second configuration information at a second-time-domain position, wherein the first configuration information indicates frequency-domain resource information for an uplink sTTI transmission, which is performed by the terminal at a third-time-domain position, and the second configuration information indicates scheduling information for the uplink sTTI transmission, which is performed by the terminal at the third-time-domain position; and, the uplink transmitting unit is configured to perform the uplink sTTI transmission at the third-time-domain position, according to the first and second configuration information.

An embodiment of the application also provides a network side device, including a transmitting unit and a receiving unit, wherein the transmitting unit is configured to transmit first configuration information to a terminal at a first-time-domain position, and transmit second configuration information to the terminal at a second-time-domain position, wherein the first configuration information indicates frequency-domain resource information for an uplink sTTI transmission, which is performed by the terminal at a third-time-domain position, and the second configuration information indicates scheduling information for the uplink sTTI transmission, which is performed by the terminal at the third-time-domain position; and, the receiving unit is configured to receive the uplink sTTI transmission at the third-time-domain position, according to the first and second configuration information.

An embodiment of the application also provides a terminal, including a processor and a transceiver, wherein the transceiver is configured to receive and transmit data under the control of the processor; and, the processor is configured to:

receive first configuration information at a first-time-domain position, and receive second configuration information at a second-time-domain position, wherein the first configuration information indicates frequency-domain resource information for an uplink sTTI transmission, which is performed by the terminal at a third-time-domain position, and the second configuration information indicates scheduling information of the uplink sTTI transmission, which is performed by the terminal at the third-time-domain position; and, perform the uplink sTTI transmission at the third-time-domain position, according to the first and second configuration information.

An embodiment of the application also provides a network side device, including a processor, and a transceiver, wherein the transceiver is configured to receive and transmit data under the control of the processor, and the processor is configured to:

transmit first configuration information to a terminal at a first-time-domain position, and transmit second configuration information to the terminal at a second-time-domain position, wherein the first configuration information indicates frequency-domain resource information of an uplink sTTI transmission, which is performed by the terminal at a third-time-domain position, and the second configuration information indicates scheduling information of the uplink sTTI transmission, which is performed by the terminal at the third-time-domain position; and, receive the uplink sTTI transmission at the third-time-domain position, according to the first and second configuration information.

An embodiment of the application also provides a non-transitory computer readable storage medium, wherein the computer readable storage medium stores computer readable instructions, which are executable by a processor, when the computer readable instructions are executed by the processor, the processor is configured to:

receive first configuration information at a first-time-domain position, and receive second configuration information at a second-time-domain position, wherein the first configuration information indicates frequency-domain resource information for an uplink sTTI transmission, which is performed by a terminal at a third-time-domain position, and the second configuration information indicates scheduling information for the uplink sTTI transmission, which is performed by the terminal at the third-time-domain position; and, perform the uplink sTTI transmission at the third-time-domain position, according to the first and second configuration information.

An embodiment of the application also provides a non-transitory computer readable storage medium, wherein the computer readable storage medium stores computer readable instructions, which are executable by a processor, when the computer readable instructions are executed by the processor, the processor is configured to:

transmit first configuration information to a terminal at a first-time-domain position, and transmit second configuration information to the terminal at a second-time-domain position, wherein the first configuration information indicates frequency-domain resource information for an uplink sTTI, which is performed by the terminal at a third-time-domain position, and the second configuration information indicates scheduling information for the uplink sTTI transmission, which is performed by the terminal at the third-time-domain position; and, receive the uplink sTTI transmission at the third-time-domain position, according to the first and second configuration information.

Compared with the related technologies, at least the following advantages may be achieved by the uplink transmission method, network side device and terminal, which are provided by the embodiments of the application. Uplink sTTI transmission is implemented, by using configuration information indication in the application. In addition, in the embodiments of the application, it may be guaranteed that size/position of frequency domain resources of multiple sPUCCHs/sPUSCHs transmitted within the same subframe is fixed. Subsequently, a time template defined in the related technologies may be reused, thereby avoiding introducing the transient period between sTTIs.

DETAILED DESCRIPTION

Figure 1:
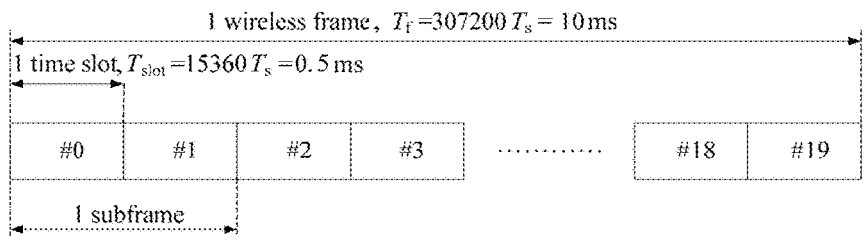
FIG. 1 is a schematic diagram illustrating a frame structure of a LTE Frequency Division Duplexing (FDD) in the related technologies.

To make technical problems to be solved by the application, technical solutions and advantages more clear, detailed descriptions will be provided in the following, accompanying with attached figures and specific embodiments. In the following descriptions, the objective for providing specific details of configurations and components is to facilitate understanding of embodiments in the application. Thus, persons having ordinary skill in the art may understand that, various changes and modifications may be made to the embodiments described here without departing from the scope and principle of the application. In addition, descriptions for known functions and structures are omitted, for clarity and simplicity.

It should be understood that, "an embodiment" or "one embodiment" mentioned throughout the specification means as follows. A specific feature, structure or characteristic related with an embodiment is included by at least one embodiment in the application. Thus, "in an embodiment" or "in one embodiment" occurred throughout the whole specification does not necessarily refer to the same embodiment. In addition, these specific features, structures or characteristics may be combined in one or more embodiments in any suitable manner.

In various embodiments of the application, it should be understood that, sequence of numbers of following processes does not mean the execution order. The execution order of each process should be determined by functions and internal logics thereof, which should not make any limitation on the implementation process of the embodiments in the application.

In addition, the terms "system" and "network" in the application are usually exchanged for use.

It should be noted that, the term "and/or" in the application only describes an association relationship of associated objects, which denotes that three relationships may exist, e.g., A and/or B may demonstrate that: A exists independently, A and B exist simultaneously, B exists independently. In addition, the character "/" in the application generally denotes that there is a "or" relationship between two adjacent associated objects.

In the embodiments of the application, it should be understood that, "B corresponding to A" means that B is associated with A, and B may be determined based on A. It should also be understood that, determining B based on A does not mean that determining B only based on A, B may be determined based on A and/or other information.

In the embodiments of the application, the form of the base station is unlimited. The base station may be a Macro Base station, a Pico Base Station, a Node B (name of 3G mobile base station), an enhanced Node B (eNB), a Femto eNB, or a Home eNode B, or a Home eNB, or HeNB, a relay station, an Access Point (AP), a Remote Radio Unit (RRU), a Remote Radio Head (RRH), and so on. The terminal may be a mobile phone (or cell phone), or another device capable of transmitting and receiving wireless signals, including a User Equipment (UE), a Personal Digital Assistant (PDA), a wireless modem, a wireless communication device, a handheld device, a laptop computer, a cordless computer, a Wireless Local Loop (WLL) station, a Customer Premise Equipment (CPE) capable of converting a mobile signal into a WiFi signal, or a mobile intelligent hot spot, an intelligent home appliance, or a device capable of initiatively communicating with a mobile communication network without a human operation, and so on.

The existing LTE FDD system adopts a Frame Structure type 1, which is referred to as FS1 for short. The structure of FS1 is shown in FIG. 1. In the FDD system, different carrier frequencies are respectively used by uplink and downlink transmissions. The uplink and downlink transmissions adopt the same frame structure. On each carrier, a wireless frame of 10 ms includes 10 subframes of 1 ms. Each subframe is divided into two time slots of 0.5 ms. The TTI length transmitted by uplink and downlink data is 1 ms.

Figure 2:
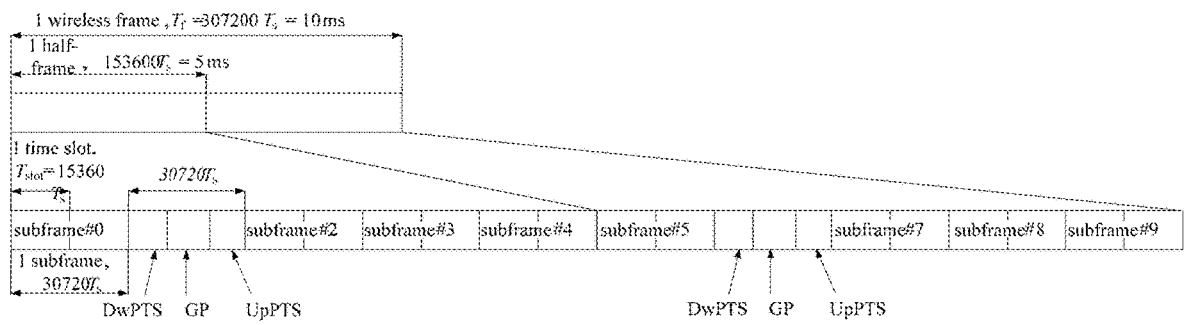
FIG. 2 is a schematic diagram illustrating a frame structure of a LTE Time Division Duplexing (TDD) in the related technologies.

The existing LTE TDD system adopts a Frame Structure type 2, which is referred to as FS2 for short and is shown in FIG. 2. In the TDD system, different subframes or different time slots with the same frequency are adopted by uplink and downlink transmissions. Each wireless frame of 10 ms in FS2 consists of two 5 ms half-frames. Each half-frame includes 5 subframes of 1 ms. The subframes in FS2 are divided into three categories: downlink subframe, uplink subframe and special subframes. Each special subframe consists of three parts of Downlink Pilot Time Slot (DwPTS), a Guard Period (GP) and an Uplink Pilot Time Slot (UpPTS). Each half-subframe includes at least one downlink subframe, at least one uplink subframe, and one special subframe at most.

In the embodiment of the application, the sTTI refers to a TTI with length shorter than existing standard TTI length (1 ms). Specifically, length of the sTTI may be 2, 3, 4, 7 OFDM symbols or SC-FDMA symbols. Definitely, the following cases are not excluded, e.g., number of other symbols does not exceed 14, or length of time domain does not exceed 1 ms. In the embodiments of the application, both of sPUSCH and sPUCCH adopt the sTTI transmission.

Figure 3:
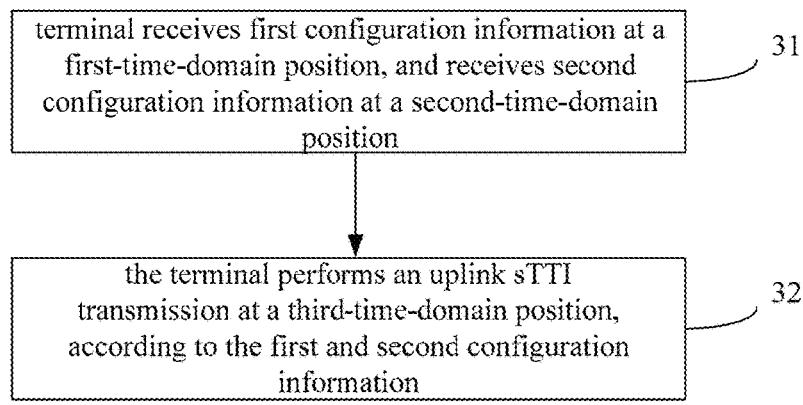
FIG. 3 is a flowchart illustrating an uplink transmission method, in accordance with an embodiment of the application.

Please refer to FIG. 3, when applying to a terminal side, the uplink transmission method provided by the embodiment of the application includes the following blocks.

In block 31, a terminal receives first configuration information at a first-time-domain position, and receives second configuration information at a second-time-domain position. The first configuration information is configured to indicate frequency-domain resource information of the terminal, when the terminal performs an uplink sTTI transmission at a third-time-domain position. The second configuration information is configured to indicate scheduling information of the terminal, when the terminal performs an uplink sTTI transmission at a third-time-domain position.

Here, the frequency-domain resource information generally includes size, and/or, position of frequency-domain resources for use in the uplink sTTI transmission. Specifically, the size of the frequency-domain resources may be denoted with number of subcarriers, or number of Resource Blocks (RBs), or other predefined frequency-domain resource allocating units. The position of the frequency-domain resource may be denoted with a relative or an absolute frequency-domain position.

In block 32, the terminal performs the uplink sTTI transmission at the third-time-domain position, according to the first configuration information and the second configuration information.

The first and second configuration information is generally related information, which is transmitted by a network side device, e.g., a base station, to a terminal. In the embodiment of the application, after performing the foregoing blocks, the uplink sTTI transmission of the terminal at the third-time-domain position is achieved, according to the received first and second configuration information.

In the embodiment of the application, the first-time-domain position may be a predefined time-domain position. For example, the first-time-domain position may be a traditional control area of each subframe or some subframes, that is, the first N OFDM symbols of one subframe.

As an implementation mode, there may be a predefined relative position relationship between the first-time-domain position and the third-time-domain position. For example, it is predetermined that, when the first-time-domain position is subframe n, the third-time-domain position is subframe (n+k), or successive A subframes starting from subframe (n+k).

As another implementation mode, first indication information indicating the third-time-domain position may be carried by the first configuration information.

Specifically, the first indication information may be offset information of the third-time-domain position, compared with the first-time-domain position. For example, the first indication information may be an offset value of the third-time-domain position, compared with a subframe, an OFDM symbol or a sTTI of the first-time-domain position. For another example, when the first-time-domain position is in subframe n, the first configuration information may indicate that, the subframe offset value of the third-time-position position compared with the first-time-domain position is k. Subsequently, the terminal may determine that the third-time-domain position of is subframe (n+k).

The first indication information may also be absolute time-domain position information of the third-time-domain position. For example, the first indication information may directly indicate a subframe number, an OFDM symbol number, or a sTTI number of the third-time-domain position. Each of foregoing various numbers may be a value, or a value range, e.g., may indicate one subframe, or numbers of multiple subframe, or may indicate numbers of multiple OFDM symbols or numbers of multiple sTTIs.

In foregoing block 31, there may be multiple implementation modes for receiving the first configuration information at the first-time-domain position.

In mode 1, the terminal may receive the first configuration information, by using predetermined time-domain resources at the first-time-domain position.

In mode 2, the terminal may receive the first configuration information at the first-time-domain position, which is transmitted by broadcast message.

In mode 3, the terminal may receive the first configuration information at the first-time-domain position, which is transmitted by high-level signaling.

In mode 4, the terminal may detect a downlink control channel at the first-time-domain position, and obtain the first configuration information from the downlink control channel. The downlink control channel may correspond to the uplink sTTI transmission. Alternatively, transmission in the downlink control channel may be achieved, by using Downlink Control Information (DCI) format. Still alternatively, transmission of the downlink control channel is within common search space, or dedicated search space of the terminal.

In foregoing block 31, receiving the second configuration information at the second-time-domain position may be different, accompanying with specific transmission scenes of the uplink sTTI.

For example, when the uplink sTTI transmission includes sPUSCH, in the embodiment of the application, a first downlink control channel with uplink DCI format is detected at the second-time-domain position, and the second configuration information is obtained from the first downlink control channel. At this time, the second configuration information may include at least one of: Modulation and Coding Scheme (MCS), sTTI length, time-domain position information, Transmission Power Control (TPC) information, precoding information, frequency hopping information, New Data indicator (NDI) information, Demodulation Reference Signal (DMRS) cyclic shift information, UL index information, Channel Quality Indicator (CQI) request information, scheduling delay information, and so on.

Also for example, when the uplink sTTI transmission includes sPUCCH, in the embodiment of the application, a second downlink control channel with a downlink DCI format is detected at the second-time-domain position, and the second configuration information is obtained from the second downlink control channel. At this time, the second configuration information may include at least one of: code rate, sTTI length, time-domain position information, TPC information, DMRS cyclic shift information, Orthogonal sequence index information, feedback delay information, and so on.

Here, the second-time-domain position corresponding to the sPUCCH and the second-time-domain position corresponding to the sPUSCH may be the same, or may be different.

In the embodiments of the application, the second-time-domain position may be a time-domain position, which is determined by scheduling timing, or feedback timing.

Specifically, when the uplink sTTI transmission is sPUSCH, the second-time-domain position is a time-domain position, which is determined by scheduling timing. For example, a downlink control channel with uplink DCI format transmitted in subframe n or sTTI is predefined, and sPUSCH transmitted at the time-domain position of (n+k) or (n+k+m) is scheduled, in which k may be a predefined value, and m may be a value informed by foregoing downlink control channel. Subsequently, a time-domain position relationship between the second-time-domain position and the third-time-domain position may be further determined. Alternatively, a time-domain position relationship of a sTTI transmission between the second-time-domain position and the third-time-domain position is determined.

Here, values of k and m respectively defined for sPUSCH and sPUCCH may be the same, or may be different.

Figure 4:
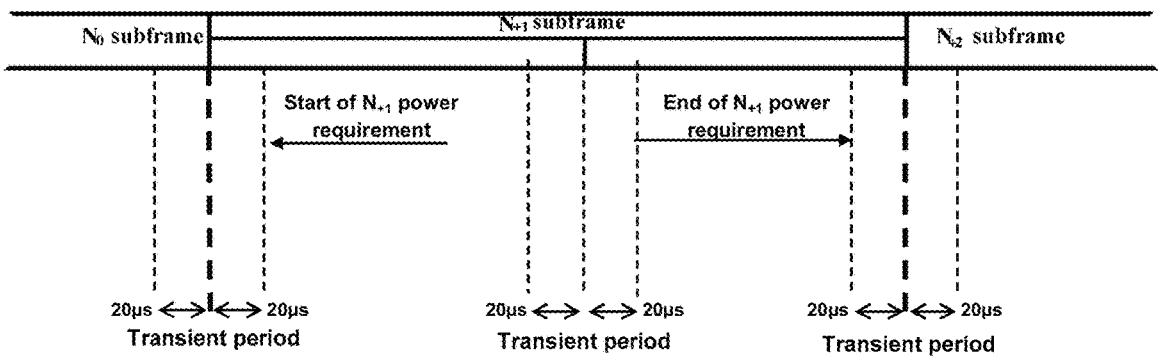
FIG. 4 is a schematic diagram illustrating a definition for a transient period, which is between a subframe and a time slot in the existing LTE system.
Figure 5:
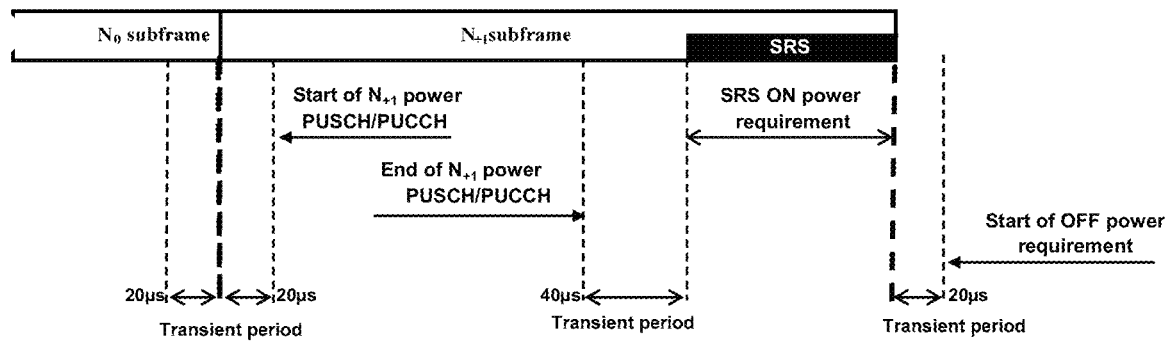
FIG. 5 is a schematic diagram illustrating a definition for a transient period, which is between an uplink channel and a Sounding Reference Signal (SRS) in the existing LTE system.
Figure 6:
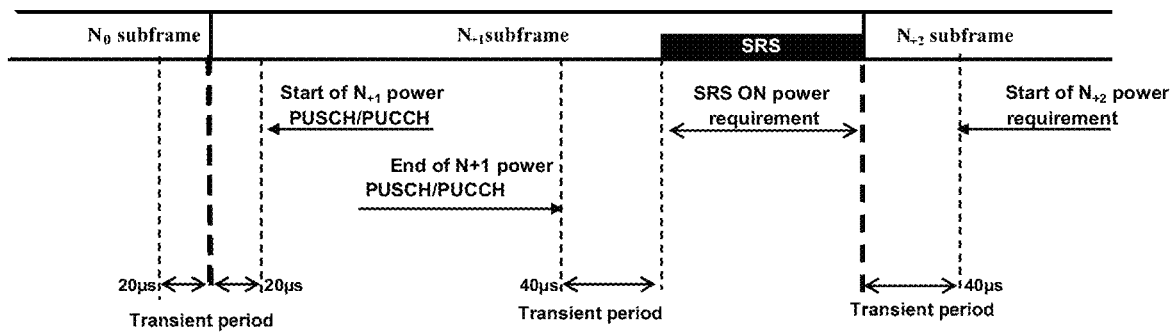
FIG. 6 is a schematic diagram illustrating a definition for a transient period, which is between an uplink channel and an SRS in the existing LTE system.

In Rel-13 and previous 3GPP 36.101 protocols, the time template illustrated in FIG. 4 is defined. The time template is configured to measure stable output power, and so on. The transient period of the time template is a hopping adjustment period, which is made by the terminal component due to changes of power and resources. The power is not stable within such period, which is not taken as measurement contents. The main reason for existence of the transient period is as follows. Two adjacent transmission power change, or frequency-domain position/size of frequency-domain resource changes. For example, FIG. 4 illustrates a definition for transient period between a subframe and a time slot in the existing LTE system. FIG. 5 illustrates a definition for transient period between an uplink channel and SRS in the LTE system, when there is no transmission for a next subframe. FIG. 6 illustrates a definition for transient period between an uplink channel and SRS in the LTE system, when there is a transmission for a next subframe.

In the LTE system, the existing channel transmission is defined by taking a subframe as a unit. When introducing the sPUSCH and sPUCCH transmissions, multiple sPUCCH/sPUSCH transmissions may exist in one subframe. If frequency-domain resource position/size of each sPUCCH/sPUSCH transmission is different, it is unable to work according to the time template defined by the existing 3GPP 36.101 protocol. In the embodiment of the application, when the third-time-domain position includes multiple uplink sTTIs, the frequency-domain resources of each uplink sTTI at the third-time-domain position are the same, so as to reuse the time template defined by existing 3GPP 36.101 protocol to work as much as possible, and reduce introduction of definition about a new transient period. After foregoing processes, it may be guaranteed that frequency-domain resource positions/sizes of multiple sPUCCH/sPUSCH in each subframe are consistent, in which the multiple sPUCCH/sPUSCH are transmitted in the manner of TDM, so as to reuse the existing time template, or make minor amendments to existing time template.

Figure 7:
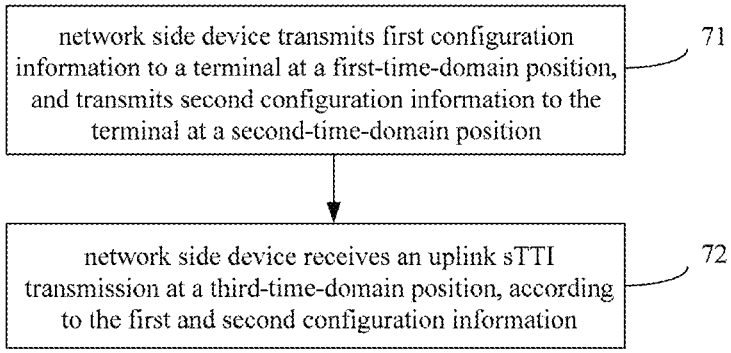
FIG. 7 is a flowchart illustrating an uplink transmission method, in accordance with another embodiment of the application.

With reference to FIG. 7, when applying to a network side, the uplink transmission method provided by the embodiment of the application includes the following blocks.

In block 71, a network side device transmits first configuration information to a terminal at a first-time-domain position, and transmits second configuration information to the terminal at a second-time-domain position. The first configuration information is configured to indicate frequency-domain resource information of uplink sTTI transmission, which is performed by the terminal at a third-time-domain position. The second configuration information is configured to indicate scheduling information of the uplink sTTI transmission, which is performed by the terminal at the third-time-position position. The frequency-domain resource information generally includes size, and/or, position of frequency-domain resources, which are for use in the uplink sTTI transmission.

Here, the network side device may be a base station, or a transmission point, or other network side device. The frequency-domain resource information includes size, and/or, position of frequency-domain resources.

In block 72, the network side device receives the uplink sTTI transmission at the third-time-domain position, according to the first and second configuration information.

After performing the foregoing blocks, the network side informs the terminal side of the first and second configuration information, such that the terminal may transmit the uplink sTTI at the third-time-domain position, according to the first and second configuration information. The network side may receive the uplink sTTI at the third-time-domain position.

As mentioned above, the first-time-domain position may be a predefined time-domain position. For example, the first-time-domain position may be a traditional control area of each subframe or some subframes, that is, the first N OFDM symbols of one subframe.

As mentioned above, in an implementation mode, there may be a predefined relative position relationship between the first-time-domain position and the third-time-domain position. For example, when the first-time-domain position is predetermined to be subframe n, the third-time-domain position is subframe (n+k).

As another implementation mode, the network side device may enable the first configuration information to carry first indication information, which is for use in indicating the third-time-domain position. Specifically, the first indication information may be offset information of the third-time-domain position, compared with the first-time-domain position. For example, the first indication information may indicate an offset value of the third-time-domain position, compared with the subframe, OFDM symbol or sTTI of the first-time-domain position. For example, when the first-time-domain position is within subframe n, the first configuration information may indicate that the subframe offset value of the third-time-domain position compared with the first-time-domain position is k. Subsequently, the terminal may determine that the third-time-domain position is subframe (n+k). The first indication information may also be absolute time-domain position information of the third-time-domain position. For example, the first indication information may directly indicate a subframe number, an OFDM symbol number, or a sTTI number. Each of foregoing number may be a value, or a value range, e.g., indicate one subframe number or multiple subframe numbers, indicate multiple OFDM symbol numbers, or multiple sTTI numbers.

In foregoing block 71, there are multiple implementation modes for the terminal to transmit the first configuration information at the first-time-domain position.

In mode 1, the network side device transmits the first configuration information to the terminal, by using predetermined frequency-domain resources of the first-time-domain position.

In mode 2, the network side device transmits the first configuration information via a broadcast message at the first-time-domain position.

In mode 3, the network side device transmits the first configuration information via high-level signaling at the first-time-domain position.

In mode 4, the network side device transmits the first configuration information via a downlink control channel of the first-time-domain position. The downlink control channel corresponds to the uplink sTTI transmission. Alternatively, transmission of the downlink control channel adopts an uplink DCI format. Still alternatively, the downlink control channel is transmitted within common search space, or dedicated search space of the terminal.

In block 71, transmitting the second configuration information to the terminal at the second-time-domain position is different, accompanying with specific transmission scenes of the uplink sTTI.

For example, when the uplink sTTI transmission is sPUSCH, the network side network transmits the second configuration information via a first downlink control channel with an uplink DCI format at the second-time-domain position. At this time, the second configuration information may include at least one of: MCS, sTTI length, time-domain position information, TPC information, precoding information, frequency hopping information, NDI information, DMRS cyclic shift information, UL index information, DAI information, CQI request information, scheduling delay information, and so on.

As another example, when the uplink sTTI transmission is sPUCCH, the network side device transmits the second configuration information, by using a second downlink control channel with a downlink DCI format at the second-time-domain position. At this time, the second configuration information may include at least one of: code rate, sTTI length, time-domain position information, TPC information, DMRS cyclic shift information, orthogonal sequence index information, feedback delay information, and so on.

Here, the second-time-domain position corresponding to sPUCCH may be the same as, or different from the second-time-domain position corresponding to sPUSCH.

In the embodiment of the application, the second-time-domain position may be determined by scheduling timing, or feedback timing.

Specifically, when the uplink sTTI transmission is sPUSCH, the second-time-sequence position is determined by the scheduling timing. For example, a downlink control channel with an uplink DCI format is predefined, the downlink control channel is transmitted within a subframe n, or within an sTTI, sPUSCH transmitted at the time-domain position of (n+k) or (n+k+m) is scheduled, in which k may be a predetermined value, m may be a value informed by foregoing downlink control channel, so as to further determine a time-domain position relationship between the second-time-domain position and the third-time-domain position, or determine a time-domain position relationship of an sTTI transmission, which is between the second-time-domain position and the third-time-position position.

When the uplink sTTI transmission is sPUCCH, the second-time-domain position is determined by the feedback timing. For example, ACK/NACK feedback information of a downlink transmission (including SPDCH and a downlink control channel indicating downlink SPS resource release) within subframe n or an sTTI is predefined, so as to be transmitted within sPUCCH at the time-domain position of (n+k) or (n+k+m). Here, k may be a predefined value, m may be a value informed by foregoing downlink control channel. Subsequently, a time-domain position relationship between the second-time-domain position and the third-time-domain position is determined. Alternatively, the time-domain-position relationship of an sTTI transmission between the second-time-domain position and the third-time-domain position is determined.

Here, k and m respectively defined for sPUSCH and sPUCCH may be the same, or may be different.

In addition, in order to reuse the time template defined by existing 3GPP 36.101 protocol to work as much as possible, and reduce introduction of definition of a new transient period, specifically, when the third-time-domain position includes multiple uplink sTTIs, frequency-domain resources of each uplink sTTI at the third-time-domain position are the same.

Figure 8:
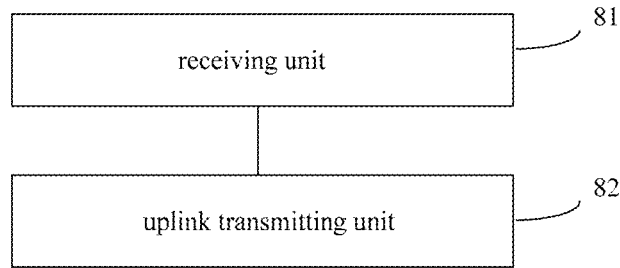
FIG. 8 is a schematic diagram illustrating a structure of a terminal, in accordance with an embodiment of the application.

An embodiment of the application also provides a related device, which is capable of implementing foregoing method. With reference to FIG. 8, the embodiment of the application also provides a terminal, including the following units.

A receiving unit 81 is configured to receive first configuration information at a first-time-domain position, and receive second configuration information at a second-time-domain position. The first configuration information is configured to indicate frequency-domain resource information, which is for use in an uplink sTTI transmission performed by the terminal at a third-time-domain position. The second configuration information is configured to indicate scheduling information, which is for use in the uplink sTTI transmission performed by the terminal at the third-time-domain position.

An uplink transmitting unit 82 is configured to perform the uplink sTTI transmission at the third-time-domain position, according to the first and second configuration information.

Optionally, the receiving unit includes a first receiving subunit.

The first receiving subunit is configured to receive the first configuration information, by using predetermined frequency-domain resources at the first-time-domain position.

Optionally, the receiving unit includes a second receiving subunit.

The second receiving subunit is configured to receive the first configuration information via a broadcast message at the first-time-domain position, or receive the first configuration information via high-level signaling at the first-time-domain position, or detect a downlink control channel at the first-time-domain position, and obtain the first configuration information from the downlink control channel. The downlink control channel corresponds to the uplink sTTI transmission. Alternatively, the downlink control channel is transmitted by using the uplink DCI format. Still alternatively, the downlink control channel is transmitted within common search space, or dedicated search space of the terminal.

When foregoing uplink sTTI transmission includes sPUSCH, the receiving unit includes a third receiving subunit. The third receiving subunit is configured to detect a first downlink control channel with the uplink DCI format at the second-time-domain position, and obtain the second configuration information from the first downlink control channel. At this time, the second configuration information may include at least one of: MCS, sTTI length, time-domain position information, TPC information, precoding information, frequency hopping information, NDI information, DMRS cyclic shift information, UL index information, DAI information, CQI request information, scheduling delay information, and so on.

When the uplink sTTI transmission includes sPUCCH, the receiving unit includes a fourth receiving subunit. The fourth receiving subunit is configured to detect a second downlink control channel with a downlink DCI format at the second-time-domain position, and obtain the second configuration information from the second downlink control channel. At this time, the second configuration information may include at least one of: code rate, sTTI length, time-domain position information, TPC information, DMRS cyclic shift information, orthogonal sequence index information, feedback delay information, and so on.

Here, the second-time-domain position corresponding to the sPUCCH and the second-time-domain position corresponding to the sPUSCH may be the same, or may be different.

Here, the second-time-domain position may be determined by the scheduling timing, or feedback timing.

Figure 9:
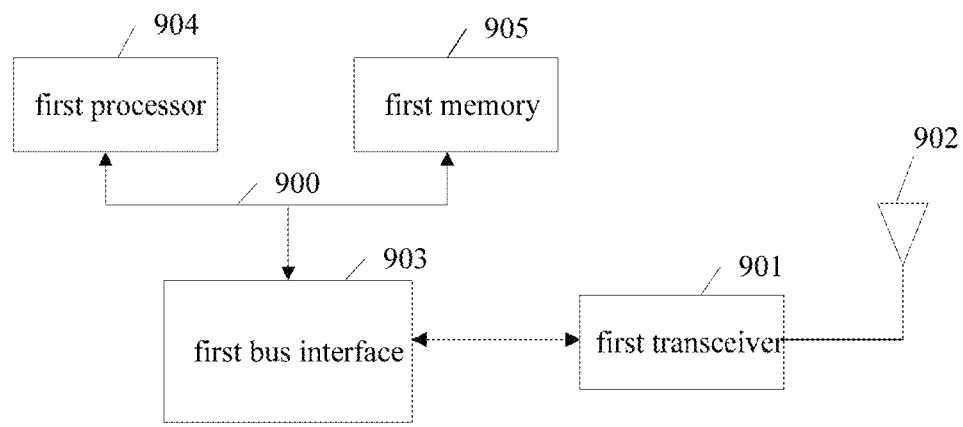
FIG. 9 is a schematic diagram illustrating a structure of a terminal, in accordance with another embodiment of the application.

With reference to FIG. 9, an embodiment of the application provides another structure of a terminal, including the following components.

A first transceiver 901 is configured to receive and transmit data under the control of a first processor 904. Specifically, the first transceiver 901 may receive first configuration information at a first-time-domain position, and receive second configuration information at a second-time-domain position.

The first processor 904 is configured to read programs in a first memory 905, and execute the following processes: perform an uplink sTTI transmission at a third-time-domain position, according to the first and second configuration information. Specifically, the first processor 904 may perform the uplink sTTI transmission, by using the first transceiver 901 and first antenna 902.

In FIG. 9, a bus architecture (denoted with first bus 900) may include an arbitrary number of interconnected bus and bridge. The first bus 900 may connect various circuits of one or more processors and a memory, in which the one or more processors are denoted with the first processor 904, and the memory is denoted with the first memory 905. The first bus 900 may connect various other circuits, such as, peripheral equipment, voltage regulator and power management circuit, which is known to persons having ordinary skill in the art and is not repeated here. A first bus interface 903 provides an interface between the first bus 900 and the first transceiver 901. The first transceiver 901 may be one component, or multiple components, e.g., multiple transmitters and receivers, which provides units for communicating with various other devices on a transmission medium. The data processed by the first processor 904 is transmitted via a wireless medium, by using the first transceiver 901 and first antenna 902. The first antenna 902 is further configured to receive the data, and transmit the data to the first processor 904 via the first transceiver 901.

The first processor 904 takes charge of managing the first bus 900, performing general processes, and providing various functions, including timing, peripheral interface, voltage regulation, power management and other control functions. However, the first memory 905 may store data, which is used by the first processor 904 when executing operations. Specifically, the first processor 904 may be a Central Processing Unit (CPU), Application Specific Integrated Circuit (ASIC), Field-Programmable Gate Array (FPGA) or Complex Programmable Logic Device (CPLD).

As an implementation mode, the first transceiver 901 may receive the first configuration information, by using predetermined frequency-domain resources at the first-time-domain position.

As another implementation mode, the first transceiver 901 may receive the first configuration information via a broadcast message at the first-time-domain position; or receive the first configuration information via high-level signaling at the first-time-domain position; or, detect a downlink control channel at the first-time-domain position, and obtain the first configuration information from the downlink control channel. The downlink control channel corresponds to the uplink sTTI transmission. Alternatively, the downlink control channel is transmitted by using an uplink DCI format. Still alternatively, the downlink control channel is transmitted within common search space, or dedicated search space of the terminal.

When the foregoing uplink sTTI transmission includes sPUSCH, the first transceiver 901 is further configured to detect a first downlink control channel with the uplink DCI format at the second-time-domain position, and obtain the second configuration information from the first downlink control channel.

When the foregoing uplink sTTI transmission includes sPUCCH, the first transceiver 901 is further configured to detect a second downlink control channel with a downlink DCI format at the second-time-domain position, and obtain the second configuration information from the second downlink control channel.

Figure 10:
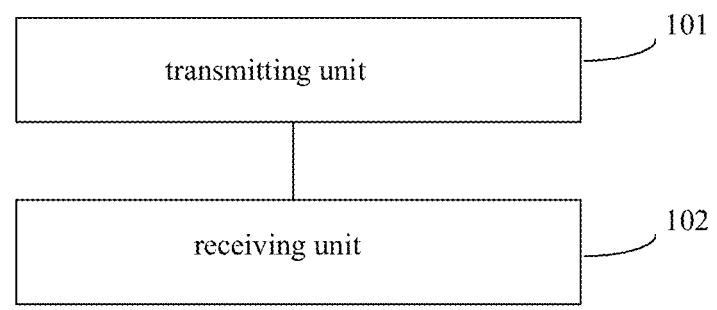
FIG. 10 is a schematic diagram illustrating a structure of a network side device, in accordance with an embodiment of the application.

With reference to FIG. 10, an embodiment of the application also provides a network side device, which may be a base station, or an AP, or another device. As shown in FIG. 10, the network side device includes the following units.

A transmitting unit 101 is configured to transmit first configuration information to a terminal at a first-time-domain position, and transmit second configuration information to the terminal at a second-time-domain position. The first configuration information is configured to indicate frequency-domain resource information, which is for use in an uplink sTTI transmission performed by the terminal at a third-time-domain position. The second configuration information is configured to indicate scheduling information, which is for use in the uplink sTTI transmission performed by the terminal at the third-time-domain position.

A receiving unit 102 is configured to receive the uplink sTTI transmission at the third-time-domain position, according to the first and second configuration information.

Optionally, the transmitting unit includes a first transmitting subunit. The first transmitting subunit is configured to transmit the first configuration to the terminal, by using predetermined frequency-domain resources at the first-time-domain position.

Optionally, the transmitting unit includes a second transmitting subunit. The second transmitting subunit is configured to transmit the first configuration information, by using a broadcast message at the first-time-domain position, or transmit the first configuration information, by using high-level signaling at the first-time-domain position, or transmit the first configuration information, by using a downlink control channel at the first-time-domain position. The downlink control channel corresponds to the uplink sTTI transmission. Alternatively, the downlink control channel is transmitted, by using an uplink DCI format. Still alternatively, the downlink control channel is transmitted within common search space, or dedicated search space of the terminal.

Optionally, the uplink sTTI transmission includes sPUSCH.

The transmitting unit includes a third transmitting subunit. The third transmitting subunit is configured to transmit the second configuration information, by using a first downlink control channel with the uplink DCI format at the second-time-domain position.

Optionally, the uplink sTTI transmission includes sPUCCH.

The transmitting unit includes a fourth transmitting subunit. The fourth transmitting subunit is configured to transmit the second configuration information, by using a second downlink control channel with a downlink DCI format at the second-time-domain position.

Figure 11:
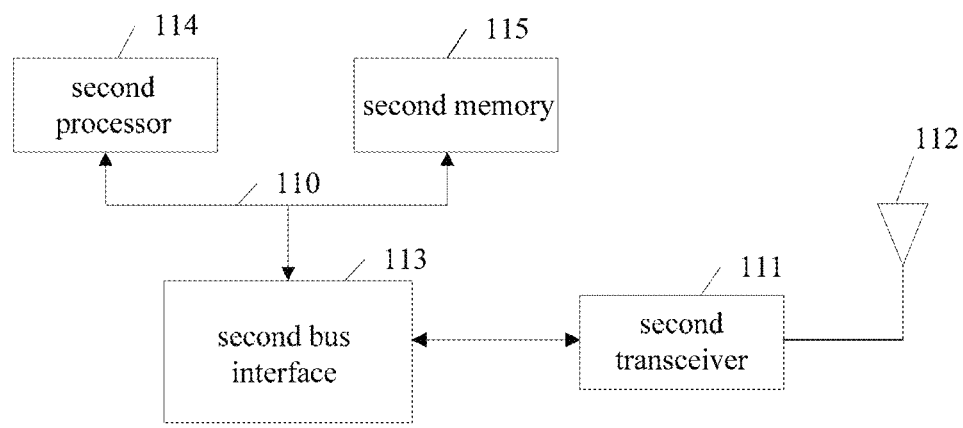
FIG. 11 is a schematic diagram illustrating a structure of a network side device, in accordance with another embodiment of the application.

With reference to FIG. 11, an embodiment of the application provides another structure of a network side device, including the following components.

A first transceiver 111 is configured to receive and transmit data under the control of a first processor 114. Specifically, the first transceiver 111 is further configured to transmit first configuration information to a terminal at a first-time-domain position, and transmit second configuration information to the terminal at a second-time-domain position.

A first processor 114 is configured to read programs in a first memory 115, and execute the following processes:

receive an uplink sTTI transmission at a third-time-domain position, according to the first and second configuration information. Specifically, reception of the uplink sTTI transmission may be achieved, by using the first transceiver 111 and first antenna 112.

In FIG. 11, a bus architecture (denoted with first bus 110) may include an arbitrary number of interconnected bus and bridge. The first bus 110 connect various circuits of one or more processors and a memory, in which the one or more processors are denoted with the first processor 113, and the memory is denoted with the first memory 115. The first bus 110 may also connect various other circuits, such as peripheral equipment, voltage regulator and power management circuit. The foregoing is known to persons having ordinary skill in the art, which is not repeated here. A first bus interface 113 provides an interface between the first bus 110 and the first transceiver 111. The first transceiver 111 may be one component, or multiple components, e.g., multiple receivers and transmitters, which provide units for communicating with various other devices on a transmission medium. The data processed by the first processor 114 is transmitted on a wireless medium, by using the first transceiver 111 and first antenna 112. Furthermore, the first antenna 112 is configured to receive the data, and transmit the data to the first processor 114 via the first transceiver 111.

The first processor 114 takes charge of managing the first bus 110, general processes, and providing various functions, including: timing, peripheral interface, voltage regulation, power management and other control functions. However, the first memory 115 is configured to store data, which is used by the first processor 114 when executing operations. Specifically, the first processor 114 may be CPU, ASIC, FPGA and CPLD.

As an implementation mode, the first transceiver 111 may transmit the first configuration information to the terminal, by using predetermined frequency-domain resources at the first-time-domain position.

As another implementation mode, the first transceiver 111 may transmit the first configuration information, by using a broadcast message at the first-time-domain position; or, transmit the first configuration information, by using high-level signaling at the first-time-domain position; or transmit the first configuration information, by using a downlink control channel at the first-time-domain position. The downlink control channel corresponds to the uplink sTTI transmission. Alternatively, the downlink control channel is transmitted by using an uplink DCI format. Still alternatively, the downlink control channel is transmitted within common search space, or dedicated search space of the terminal.

When the uplink sTTI transmission includes sPUSCH, the first transceiver 111 is further configured to transmit the second configuration information, by using a first downlink control channel with the uplink DCI format at the second-time-domain position.

When the uplink sTTI transmission includes sPUCCH, the first transceiver 111 is further configured to transmit the second configuration information, by using a second downlink control channel with a downlink DCI format at the second-time-domain position.

Figure 12:
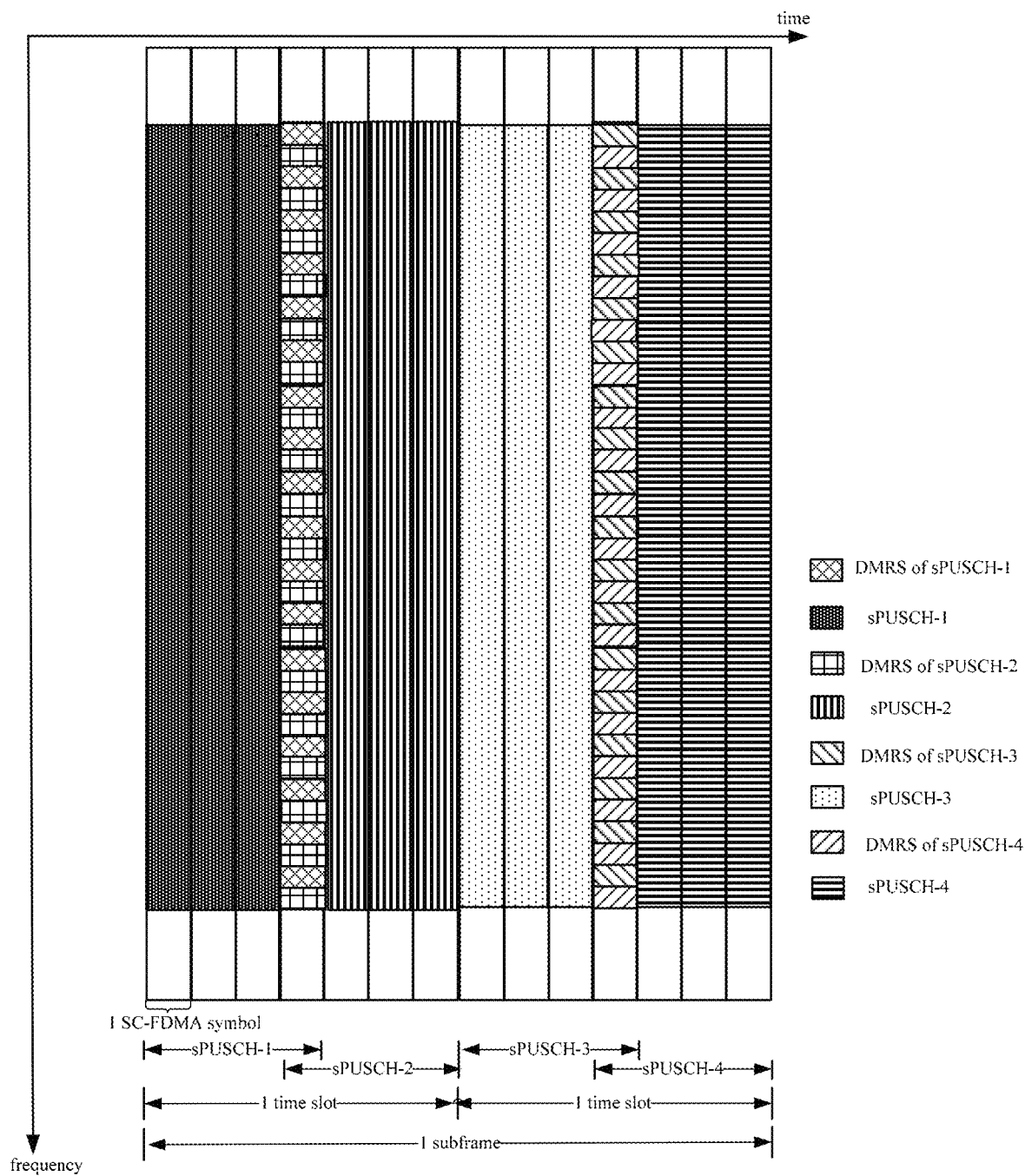
FIG. 12 is a schematic diagram illustrating an uplink sTTI transmission, in accordance with an embodiment of the application.
Figure 13:
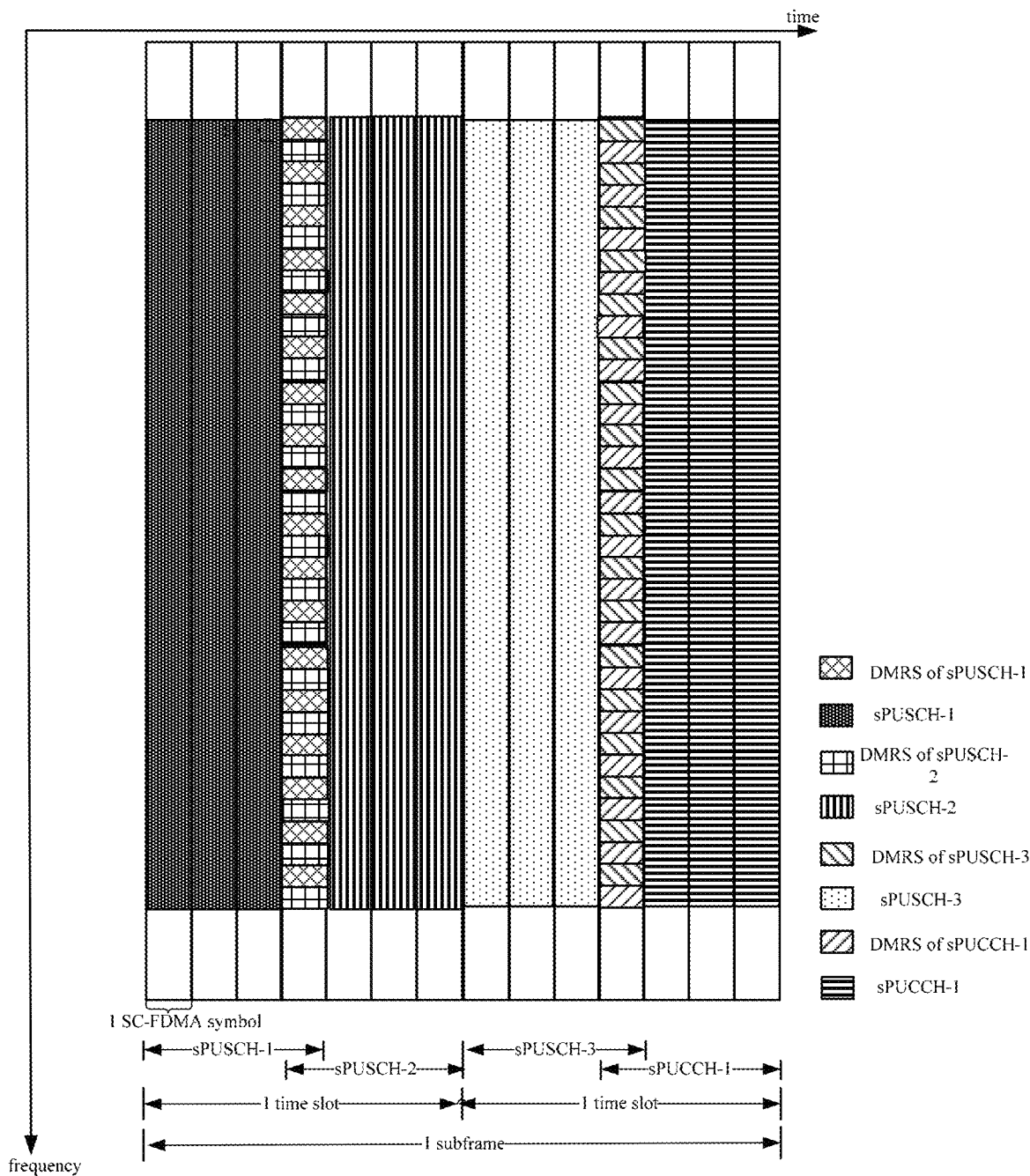
FIG. 13 is a schematic diagram illustrating an uplink sTTI transmission, in accordance with another embodiment of the application.

Finally, further descriptions are provided by the embodiments of the application, accompanying with examples in FIG. 12 and FIG. 13 of two uplink sTTI transmissions.

Embodiment 1: as shown in FIG. 12, taking sTTI transmission with four symbols as an example, assume that one subframe includes 4 sTTI transmissions, each sTTI is sPUSCH transmission, specific process is as follows.

A) A terminal detects a downlink control channel (determines search space according to interleaved transmission scheme of traditional Physical Downlink Control Channel (PDCCH), and detects the search space) with an uplink DCI format, which corresponds to the sTTI transmission, in a traditional control area (e.g., first three OFDM symbols) of subframe (n–k) (assume that k=4, other values of k are not excluded). The terminal obtains frequency-domain resources from information carried by the downlink control channel, in which the frequency-domain resources are for use in transmitting sPUSCH by the terminal in subframe n. For example, the frequency-domain resources indicated by the downlink control channel are RB 1~3 (other indicated units of frequency-domain resources are not excluded, e.g., subcarrier, or other predetermined frequency-domain resource allocating unit), subsequently it means that the frequency-domain resources of uplink transmission of the terminal in subframe n are RB1~3.

B) Mode 1: the terminal detects scheduling information of sPUSCH-1 in search space of time-domain position of the first sTTI for scheduling subframe n, according to pre-defined scheduling sequence of sPUSCH. That is, the terminal detects a downlink control channel with an uplink DCI format. The time-domain position may be sTTI of nsTTI-a, or may be a certain sTTI within subframe (n-m), or may be a traditional control area of subframe (n-m), in which nsTTI is the number of sTTI located by sPUSCH1, a is the predefined scheduling sequence. Transmission information of sPUSCH-1, e.g., MCS, TPC, NDI, is determined by scheduling information carried by the detected downlink control channel. According to the transmission information, sPUSCH-1 is transmitted on RB1~3 within the first sTTI of subframe n, that is, the sTTI with the number of nsTTI.

C) Alternatively, mode 2: the terminal detects a downlink control channel (e.g., the first sTTI within subframe n, e.g., traditional control area of each subframe before the sTTI with number nsTTI, and/or, a downlink control channel with the uplink DCI format adopted by blind detection in the search space of each sTTI) with the uplink DCI format, in the search space of traditional control area of each downlink subframe, and/or, search space of sTTI. When detecting such downlink control channel, the terminal determines a time-domain position located by the sTTI transmission, which is scheduled by the downlink control channel, according to the time-domain position indicated by the scheduling information carried by the downlink control channel, so as to detect the first sTTI of subframe n, that is, the scheduling information of sPUSCH-1 transmitted in sTTI with number nsTTI. The terminal determines transmission information of sPUSCH-1, e.g., MCS, TPC, NDI, according to scheduling information carried by the detected downlink control channel. According to the transmission information, sPUSCH-1 is transmitted on RB1~3 within the first sTTI of subframe n, that is, the sTTI with number nsTTI.

D) Similarly, according to foregoing mode 1 or 2, the terminal may obtain scheduling information of sPUSCH-i, which is transmitted in $i^{th}$ sTTI of subframe n, that is, the sTTI with number nsTTI+i−1. The terminal determines transmission information of sPUSCH-i, e.g., MCS, TPC, NDI, according to the scheduling information carried by the detected downlink control channel. According to the transmission information, the terminal transmits sPUSCH-i on RB1~3 in the $i^{th}$ sTTI of subframe n, that is, the sTTI with number nsTTI+i−1, in which i=2, 3, 4. Subsequently, it is guaranteed that size and position of each frequency-domain resource for transmitting sPUSCH in the manner of TDM are the same, in which the sPUSCH is transmitted in 4 time domains of subframe n, so as to avoid defining transient period between sPUSCHs.

Embodiment 2, as shown in FIG. 13, taking sTTI transmission with four symbols as an example, assume that one subframe includes 4 sTTI transmissions, the first three sTTI transmissions are sPUSCH transmissions, the last sTTI transmission is sPUCCH transmission, specific process is as follows.

A) A terminal detects a downlink control channel (determines search space according to interleaved transmission scheme of traditional PDCCH, and detects the search space) with an uplink DCI format, which corresponds to sTTI transmission, in a traditional control area (e.g., the first three OFDM symbols) of subframe (n-k) (assume that k=4, other values of k are not excluded). The terminal obtains frequency-domain resources for transmitting sPUSCH by the terminal in subframe n, by using information carried by the downlink control channel, e.g., the frequency-domain resources indicated by the downlink control channel are RB1~3 (other units indicated by the frequency-domain resources are not excluded, e.g., subcarrier, or other predetermined frequency-domain resources allocating units), it means that the frequency-domain resources for uplink transmission of the terminal in subframe n are RB1~3.

B) The terminal obtains the $i^{th}$ sTTI of subframe n, according to the first or second method in the first embodiment, that is, obtains the scheduling information of sPUSCH-i transmitted in the sTTI with number nsTTI+i−1. The terminal determines transmission information of sPUSCH-i, e.g., MCS, TPC, NDI, according to the scheduling information carried by the detected downlink control channel. According to the transmission information, the terminal transmits sPUSCH-i on RB1~3 in the sTTI with number nsTTI+i−1, in which i=1, 2, 3.

C) The terminal detects a downlink control channel with a downlink DCI format, in search space of a traditional control area of each downlink subframe, and/or, in search space of sTTI.

Mode 1: the terminal determines a downlink subframe, and/or, sTTI, which performs ACK/NACK feedback in sPUCCH, according to predefined ACK/NACK feedback sequence, in which the sPUCCH is in the fourth sTTI of subframe n, that is, the sTTI with number nsTTI+3, and nsTTI is the number of sTTI located by sPUSCH1. The terminal determines transmission information of sPUCCH-1, e.g., code rate, TPC, according to indication information carried by the downlink control channel with downlink DCI format, in which the downlink control channel is detected within these downlink subframes, and/or, sTTI. According to the transmission information, the terminal transmits sPUCCH-1 on RB1~3 of the fourth sTTI in subframe n, that is, the sTTI with number nsTTI+3.

Mode 2: the terminal determines a time-domain position located by the ACK/NACK feedback, according to indication information feeding back time-domain position, in which the indication information is carried by detected downlink control channel with downlink DCI format. According to such method, the terminal determines indication information fed back by ACK/NACK in sPUCCH of the fourth sTTI in subframe n, that is, the sTTI with number nsTTI+3. The terminal determines transmission information of sPUCCH-1, e.g., code rate, TPC, according to the indication information carried by a downlink control channel with downlink DCI format, in which the downlink control channel is detected within a downlink subframe and/or sTTI. According to the transmission information, the terminal transmits sPUCCH-1 on RB1~3 in the fourth sTTI of subframe n, that is, the sTTI with number nsTTI+3.

Thus, it can be seen that, in FIG. 13, it is guaranteed that size and position of frequency-domain resource about sPUSCH and sPUCCH transmitted in 4 time domains of subframe n are the same, in which foregoing frequency-domain resources are transmitted in the manner of TDM, thereby avoiding defining transient period between sPUSCH and sPUSCH, as well as between sPUSCH and sPUCCH.

It should be noted that, in foregoing example, an sTTI transmission of 4 symbols is taken as an example, which is similar for sTTI transmission with other symbol length. Besides, in one subframe, sTTI transmissions with different symbol lengths may exist simultaneously, in the manner of TDM, e.g., a first sTTI transmission possesses a two-symbol length, a second sTTI transmission possesses a four-symbol length, a third sTTI transmission possesses a seven-symbol length, and so on. Processing procedure thereof is similar to foregoing process, which is not repeated here.

It should be noted that, in the embodiment of the application, sharing the same DMRS by multiple sTTIs in the manner of comb is taken as DMRS design of an uplink transmission. Implementation of the application is not affected by other DMRS designs of uplink transmission.

It should be noted that, in the foregoing example, time-domain position 1 is traditional control area of subframe (n-k). A relative time-domain position of time-domain position 1 and time-domain position 3 is fixed. In a case, where another definition for time-domain position 1 is provided, meanwhile there exists another definition for the relative relationship between time-domain position 1 and time-domain position 3, processing procedure is similar, which is not repeated here. When multiple sTTI transmissions of one subframe are sPUCCH, processing procedure of each sPUCCH is similar to the process of sPUCCH-1 in the second example, which is not repeated here.

In view of above, in the uplink transmission method provided by the embodiments of the application, an uplink sTTI transmission is implemented, after configuring indication. In addition, in the embodiments of the application, it is guaranteed that size/position of frequency-domain resources of multiple sPUCCH/sPUSCH transmitted within the same subframe is fixed, so as to reuse the time template defined in the related technologies, and avoid introduction of transient period between sTTIs.

The foregoing is optional implementation modes of the application. It should be noted that, for persons having ordinary skill in the art, several improvements and modifications may be made, without departing from the principle of the application. These improvements and modifications should be taken as the protection scope of the application.

What is claimed is:

1. An uplink transmission method, comprising:
    receiving, by a terminal, first configuration information at a first-time-domain position, receiving second configuration information at a second-time-domain position, wherein the first configuration information indicates frequency-domain resource information for an uplink shortened Transmission Time Interval (sTTI) transmission, which is performed by the terminal at a third-time-domain position, and the second configuration information indicates scheduling information for the uplink sTTI transmission, which is performed by the terminal at the third-time-domain position; and,
    performing, by the terminal, the uplink sTTI transmission at the third-time-domain position, according to the first and second configuration information;
    wherein the frequency-domain resource information is shared by a plurality of uplink sTTI for the same terminal at the third-time-domain position;
    wherein the first configuration information carries first indication information, which indicates the third-time-domain position;
    wherein the first-time-domain position is in subframe n;
    the first indication information indicates that a subframe offset value of the third-time-domain position compared with the first-time-domain position is k, wherein n and k are integers; or,
    the first indication information directly indicates that the third-time-domain position is subframe (n+k) or a plurality of successive subframes starting from the subframe (n+k);
    wherein the receiving the first configuration information at the first-time-domain position, comprises:
    detecting a downlink control channel at the first-time-domain position, and obtaining the first configuration information from the downlink control channel, wherein the downlink control channel corresponds to the uplink sTTI transmission, or the downlink control channel is transmitted by using an uplink Downlink Control Information (DCI) format, or, the downlink control channel is transmitted within common search space or dedicated search space of the terminal;
    wherein a value of k is configured by a network side device through PDCCH according to amount of data of the uplink sTTI transmission.

2. The method according to claim 1, wherein the receiving the first configuration information at the first-time-domain position further comprises:

receiving the first configuration information on a predetermined frequency-domain resource at the first-time-domain position.

3. The method according to claim 1, wherein the method further includes at one of the following modes:
first mode:
the uplink sTTI transmission comprises a shortened Physical Uplink Shared Channel (sPUSCH), and the receiving the second configuration information at the second-time-domain position comprises:
detecting a first downlink control channel with an uplink DCI format at the second-time-domain position, and obtaining the second configuration information from the first downlink control channel;
second mode:
the uplink sTTI transmission comprises a shortened Physical Uplink Control Channel (sPUCCH), and the receiving the second configuration information at the second-time-domain position comprises:
detecting a second downlink control channel with a downlink DCI format at the second-time-domain position, and obtaining the second configuration information from the second downlink control channel.

4. The method according to claim 1, wherein the method further includes at least one of:
the third-time-domain position comprises multiple uplink sTTIs, and frequency-domain resources of each uplink sTTI are the same; the first-time-domain position is a predefined time-domain position;
there is a predefined relative position relationship between the first-time-domain position and the third-time-domain position;
the first indication information is offset information of the third-time-domain position, compared with the first-time-domain position, or absolute time-domain position information of the third-time-domain position;
the second-time-domain position is determined by scheduling timing, or feedback timing.

5. An uplink transmission method, comprising:
transmitting, by a network side device, first configuration information to a terminal at a first-time-domain position, and transmitting second configuration information to the terminal at a second-time-domain position, wherein the first configuration information indicates frequency-domain resource information for an uplink shortened Transmission Time Interval (sTTI) transmission, which is performed by the terminal at a third-time-domain position, and the second configuration information indicates scheduling information for the uplink sTTI transmission, which is performed by the terminal at the third-time-domain position; and,
receiving, by the network side device, the uplink sTTI transmission at the third-time-domain position, according to the first and second configuration information;
wherein the frequency-domain resource information is shared by a plurality of uplink sTTI for the same terminal at the third-time-domain position;
wherein the first configuration information carries first indication information, which indicates the third-time-domain position;
wherein the first-time-domain position is in subframe n;
the first indication information indicates that a subframe offset value of the third-time-domain position compared with the first-time-domain position is k, wherein n and k are integers; or,
the first indication information directly indicates that the third-time-domain position is subframe (n+k) or a plurality of successive subframes starting from the subframe (n+k);
wherein the transmitting the first configuration information to the terminal at the first-time-domain position, comprises:
transmitting the first configuration information via a downlink control channel at the first-time-domain position, wherein the downlink control channel corresponds to the uplink sTTI transmission, or the downlink control channel is transmitted by using an uplink Downlink Control Information (DCI) format, or the downlink control channel is transmitted within common search space or dedicated search space of the terminal;
wherein a value of k is configured by a network side device through PDCCH according to amount of data of the uplink sTTI transmission.

6. The method according to claim 5, wherein the transmitting the first configuration information to the terminal at the first-time-domain position, further comprises:
transmitting the first configuration information to the terminal on a predetermined frequency-domain resource at the first-time-domain position.

7. The method according to claim 5, wherein the method further includes at one of the following modes:
first mode:
the uplink sTTI transmission comprises a shortened Physical Uplink Shared Channel (sPUSCH), and the transmitting the second configuration information to the terminal at the second-time-domain position comprises:
transmitting the second configuration information via a first downlink control channel with an uplink DCI format at the second-time-domain position;
second mode:
the uplink sTTI transmission comprises a shortened Physical Uplink Control Channel (sPUCCH), and the transmitting the second configuration information to the terminal at the second-time-domain position comprises:
transmitting the second configuration information via a second downlink control channel with a downlink DCI format at the second-time-domain position.

8. The method according to claim 5, wherein the method further includes at least one of:
the third-time-domain position comprises multiple uplink sTTIs, and frequency-domain resources of each uplink sTTI are the same;
the first-time-domain position is a predefined time-domain position;
there is a predefined relative position relationship between the first-time-domain position and the third-time-domain position;
the first indication information is offset information of the third-time-domain position, compared with the first-time-domain position, or absolute time-domain position information of the third-time-domain position;
the second-time-domain position is determined by scheduling timing, or feedback timing.

9. A network side device for implementing the method according to claim 5, comprising a transmitting unit, and a receiving unit, wherein
the transmitting unit is configured to transmit first configuration information to a terminal at a first-time-domain position, and transmit second configuration information to the terminal at a second-time-domain position, wherein the first configuration information indicates frequency-domain resource information for an uplink shortened Transmission Time Interval (sTTI) transmission, which is performed by the terminal at a third-time-domain position, and the second configuration information indicates scheduling information for the uplink sTTI transmission, which is performed by the terminal at the third-time-domain position; and, the receiving unit is configured to receive the uplink sTTI transmission at the third-time-domain position, according to the first and second configuration information;

wherein the frequency-domain resource information is shared by a plurality of uplink sTTI for the same terminal at the third-time-domain position;

wherein the transmitting unit comprises a second transmitting subunit, and the second transmitting subunit is configured to:

transmit the first configuration information via a downlink control channel at the first-time-domain position, wherein the downlink control channel corresponds to the uplink sTTI transmission, or the downlink control channel is transmitted by using an uplink DCI format, or the downlink control channel is transmitted via common search space or dedicated search space of the terminal.

10. The network side device according to claim 9, wherein the transmitting unit further comprises a first transmitting subunit, and the first transmitting subunit is configured to transmit the first configuration information to the terminal on a predetermined frequency-domain resource at the first-time-domain position.

11. The network side network according to claim 9, wherein the network side network further includes at least one of the following modes:

first mode:
the uplink sTTI transmission comprises a shortened Physical Uplink Shared Channel (sPUSCH), and the transmitting unit comprises:
a third transmitting subunit, configured to transmit the second configuration information via a first downlink control channel with an uplink DCI format at the second-time-domain position;

second mode:
the uplink sTTI transmission comprises a shortened Physical Uplink Control Channel (PUCCH), and the transmitting unit comprises:
a fourth transmitting subunit, configured to transmit the second configuration information via a second downlink control channel with a downlink DCI format at the second-time-domain position.

12. The network side device according to claim 9, wherein the network side device further includes at least one of the following items:

the third-time-domain position comprises multiple uplink sTTIs, and frequency-domain resources of each uplink short TTI are the same;

wherein the first-time-domain position is a predefined time-domain position;

there is a predefined relative position relationship between the first-time-domain position and the third-time-domain position;

the first configuration information carries first indication information, which indicates the third-time-domain position;

the first indication information is offset information of the third-time-domain position, compared with the first-time-domain position, or absolute position information of the third-time-domain position;

the second-time-domain position is determined by scheduling timing, or feedback timing.

13. The network side device according to claim 9, wherein the first-time-domain position is in subframe n;

the first indication information indicates that a subframe offset value of the third-time-domain position compared with the first-time-domain position is k, wherein n and k are integers; or, the first indication information directly indicates that the third-time-domain position is subframe (n+k) or a plurality of successive subframes starting from the subframe (n+k).

14. A terminal, comprising a receiving unit, and an uplink transmitting unit, wherein the receiving unit is configured to receive first configuration information at a first-time-domain position, and receive second configuration information at a second-time-domain position, wherein the first configuration information indicates frequency-domain resource information for an uplink shortened Transmission Time Interval (sTTI) transmission, which is performed by the terminal at a third-time-domain position, and the second configuration information indicates scheduling information for the uplink sTTI transmission, which is performed by the terminal at the third-time-domain position; and, the uplink transmitting unit is configured to perform the uplink sTTI transmission at the third-time-domain position, according to the first and second configuration information;

wherein the frequency-domain resource information is shared by a plurality of uplink sTTI for the same terminal at the third-time-domain position;

wherein the first configuration information carries first indication information, which indicates the third-time-domain position;

wherein the first-time-domain position is in subframe n;

the first indication information indicates that a subframe offset value of the third-time-domain position compared with the first-time-domain position is k, wherein n and k are integers; or, the first indication information directly indicates that the third-time-domain position is subframe (n+k) or a plurality of successive subframes starting from the subframe (n+k);

wherein the receiving unit comprises a second receiving subunit, and the second receiving subunit is configured to:

detect a downlink control channel at the first-time-domain position, and obtain the first configuration information from the downlink control channel, wherein the downlink control channel corresponds to the uplink sTTI transmission, or the downlink control channel is transmitted by using an uplink Downlink Control Information (DCI) format, or the downlink control channel is transmitted within common search space, or within dedicated search space of the terminal;

wherein a value of k is configured by a network side device through PDCCH according to amount of data of the uplink sTTI transmission.

15. The terminal according to claim 14, wherein the receiving unit further comprises a first receiving subunit, which is configured to receive the first configuration information on a predetermined frequency-domain resource at the first-time-domain position.

16. The terminal according to claim 14, wherein the terminal further includes at least one of the following modes:

first mode:
the uplink sTTI transmission comprises a shortened Physical Uplink Shared Channel (sPUSCH), and the receiving unit comprises:
a third receiving subunit, configured to detect a first downlink control channel with an uplink DCI format at the second-time-domain position, and obtain the second configuration information from the first downlink control channel;

second mode:
the uplink sTTI transmission comprises a shortened Physical Uplink Control Channel (sPUCCH), and the receiving unit comprises:
a fourth receiving subunit, configured to detect a second downlink control channel with a downlink DCI format at the second-time-domain position, and obtain the second configuration information from the second downlink control channel.

17. The terminal according to claim 14, wherein the terminal further includes at least one of the following items:
the third-time-domain position comprises multiple uplink sTTIs, and frequency-domain resources of each uplink sTTI are the same;
the first-time-domain position is a predefined time-domain position;
there is a predefined relative position relationship between the first-time-domain position and the third-time-domain position;
the first indication information is offset information of the third-time-domain position, compared with the first-time-domain position, or absolute position information of the third-time-domain position;
the second-time-domain position is determined by scheduling timing, or feedback delay relationship.

* * * * *